United States Patent
Takeuchi (10) Patent No.: US 9,025,191 B2
(45) Date of Patent: May 5, 2015

(54) DISPLAY OPERATION DEVICE, NON-TRANSITORY COMPUTER-READABLE RECORDING MEDIUM STORING DISPLAY OPERATION PROGRAM, AND DISPLAY OPERATION METHOD AND IMAGE FORMING APPARATUS

(71) Applicant: Kyocera Document Solutions Inc., Osaka (JP)

(72) Inventor: Naoki Takeuchi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/227,815

(22) Filed: Mar. 27, 2014

(65) Prior Publication Data
US 2014/0293347 A1    Oct. 2, 2014

(30) Foreign Application Priority Data
Mar. 28, 2013    (JP) .................................. 2013-068749

(51) Int. Cl.
*G06F 3/12*     (2006.01)
*G06F 3/0488*   (2013.01)
*H04N 1/00*     (2006.01)
*G03G 15/00*    (2006.01)

(52) U.S. Cl.
CPC ............ *G06F 3/1253* (2013.01); *G06F 3/0488* (2013.01); *H04N 1/00411* (2013.01); *H04N 1/00466* (2013.01); *H04N 1/00482* (2013.01); *H04N 2201/0082* (2013.01); *G03G 15/50* (2013.01); *G03G 15/502* (2013.01)

(58) Field of Classification Search
CPC . H04N 1/00649; G06F 3/1205; G06F 3/1294; G06F 3/0481; G06F 3/0488
USPC ................................ 358/1.1–3.26, 1.11–1.18
See application file for complete search history.

(56) References Cited

U.S. PATENT DOCUMENTS

| | | | |
|---|---|---|---|
| 2011/0157636 A1* | 6/2011 | Maeda ......................... | 358/1.15 |
| 2013/0070270 A1* | 3/2013 | Arita et al. ................... | 358/1.12 |
| 2014/0075552 A1* | 3/2014 | Guriappa Srinivas et al. . | 726/19 |

FOREIGN PATENT DOCUMENTS

JP    2010009365    1/2010

* cited by examiner

*Primary Examiner* — Marcellus Augustin
(74) *Attorney, Agent, or Firm* — K&L Gates LLP (57) ABSTRACT

A display operation device is included in an image forming apparatus. The display operation device includes an apparatus-image display unit and a paper feed/output specifying unit. The apparatus-image display unit displays an image of the image forming apparatus on a screen. In the image, a paper feed source and a paper output destination are separately located. The paper feed/output specifying unit receives at least information specifying the paper feed source and the paper output destination as a result of linking of the paper feed source with the paper output destination in the image on the screen.

15 Claims, 9 Drawing Sheets

DISPLAY OPERATION DEVICE, NON-TRANSITORY COMPUTER-READABLE RECORDING MEDIUM STORING DISPLAY OPERATION PROGRAM, AND DISPLAY OPERATION METHOD AND IMAGE FORMING APPARATUS

REFERENCE TO RELATED APPLICATIONS

This application is based upon and claims the benefit of priority from the corresponding Japanese Patent Application No. 2013-068749, filed in the Japan Patent Office on Mar. 28, 2013, the entire contents of which are incorporated herein by reference.

BACKGROUND

The present disclosure relates to a display operation device for providing an instruction to form an image, a non-transitory computer-readable recording medium storing a display operation program, and a display operation method and an image forming apparatus.

A typical digital multi-function device includes a panel unit having a touch panel screen, as a display operation device. A user inputs an instruction to perform printing, setting, or the like and views the result of such an input through the screen of the panel unit of the typical image forming apparatus.

To specify a detailed condition by using the typical image forming apparatus, a user performs an input operation using operation keys displayed on the screen. In particular, to specify a paper feed source and a paper output destination and specify conditions for post-processing to be performed on a sheet after printing, a user needs to perform a large number of key operations.

SUMMARY

A display operation device according to an embodiment of the present disclosure includes an apparatus-image display unit and a paper feed/output specifying unit. The apparatus-image display unit is configured to display an image of an image forming apparatus on a screen. The image is an image wherein a paper feed source and a paper output destination are separately located. The paper feed/output specifying unit is configured to receive information specifying the paper feed source and the paper output destination as a result of linking of the paper feed source with the paper output destination in the apparatus image on the screen.

A non-transitory computer-readable recording medium according to an embodiment of the present disclosure stores a display operation program executable by a computer. The display operation program causes the computer to serve as an apparatus-image display unit and a paper feed/output specifying unit. The apparatus-image display unit displays an image of an image forming apparatus on a screen. The image is an image in which a paper feed source and a paper output destination are separately located. The paper feed/output specifying unit receives information specifying the paper feed source and the paper output destination as a result of linking of the paper feed source with the paper output destination in the image on the screen.

A display operation method according to an embodiment of the present disclosure includes: (i) displaying, via an apparatus-image display unit, an image of an image forming apparatus on a screen, the image being an image in which a paper feed source and a paper output destination are separately located; and (ii) receiving, via a paper feed/output specifying unit, information specifying the paper feed source and the paper output destination as a result of linking of the paper feed source with the paper output destination in the image on the screen.

Additional features and advantages are described herein, and will be apparent from the following detailed description and the figures.

BRIEF DESCRIPTION OF THE DRAWINGS

The drawings are intended to illustrate some embodiments and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

An embodiment of the present disclosure will be described below with reference to the drawings.

Figure 1:
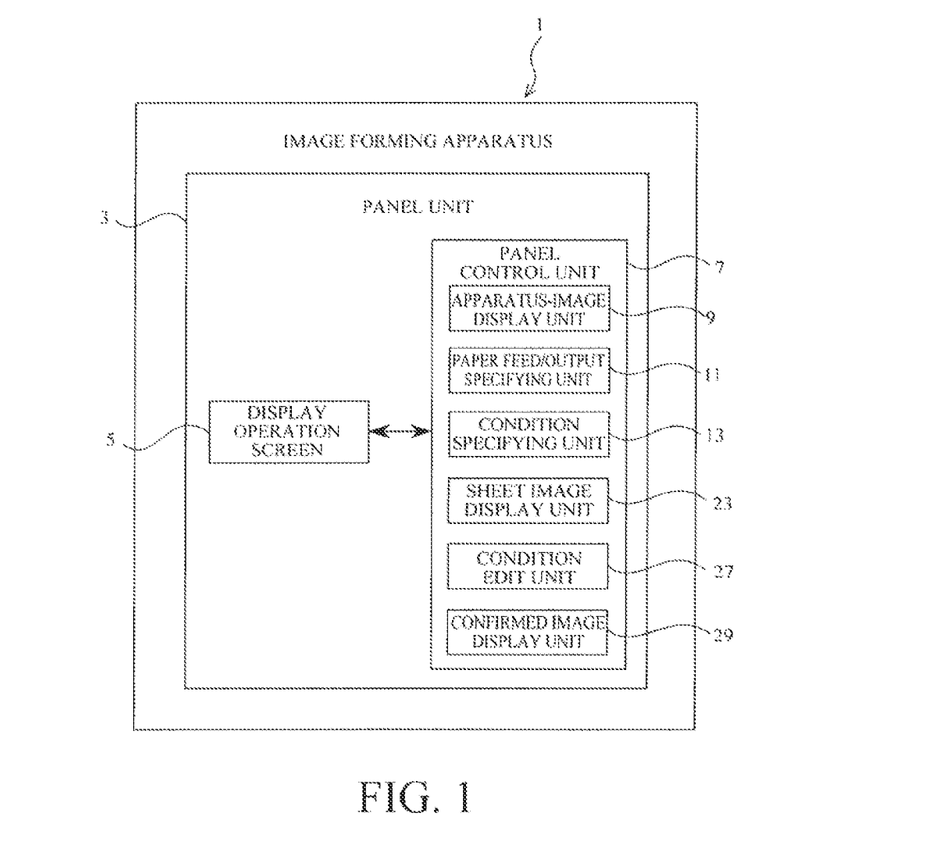
FIG. 1 shows a configuration of an image forming apparatus having a panel unit according to an embodiment of the present disclosure.
Figure 2:
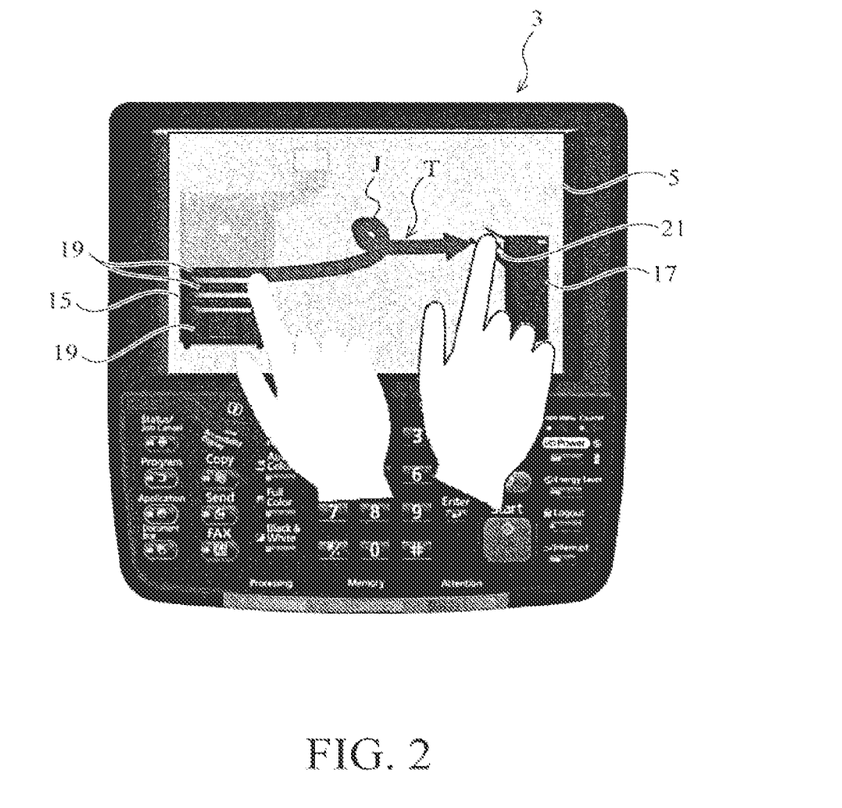
FIG. 2 shows the panel unit according to an embodiment of the present disclosure.

FIG. 1 illustrates a configuration of an image forming apparatus having a panel unit. FIG. 2 illustrates the panel unit.

An image forming apparatus 1 in FIG. 1 is, for example, a digital multi-function device. The image forming apparatus 1 is provided with various functions such as a print function of performing printing. The image forming apparatus 1 according to an embodiment has a configuration compatible with these functions, and also includes a panel unit 3 serving as a display operation device. The configuration compatible with the various functions is not illustrated in FIG. 1.

The panel unit 3 includes a display operation screen 5 and a panel control unit 7.

The display operation screen 5 is, for example, a touch-panel liquid-crystal display screen. The display operation screen 5 is used, for example, to input print settings of the image forming apparatus 1 and to display the input result. An input operation may be performed with a user's finger, a dedicated pen, or the like. An embodiment will be described below under the assumption that an input operation is performed with a user's finger.

The panel control unit 7 includes a processor and a read only memory (ROM) storing operation programs for the processor. The panel control unit 7 executes a display operation program, thereby controlling display of input operations and their input results on the display operation screen 5. Specifically, the panel control unit 7 serves as an apparatus-image display unit 9, a paper feed/output specifying unit 11, a condition specifying unit 13, a sheet image display unit 23, a condition edit unit 27, and a confirmed image display unit 29.

The apparatus-image display unit 9 provides an apparatus-image display function. As in FIG. 2, the apparatus-image display unit 9 displays an image of the image forming apparatus 1, in which a paper feed source 15 and a paper output destination 17 are separately located, on the display operation screen 5. In an embodiment, the apparatus-image display unit 9 displays the paper feed source 15 and the paper output destination 17 (hereinafter, may be referred to as a "paper feed source image 15" and a "paper output destination image 17") in the image that are separately located in the left and right end portions, on the display operation screen 5.

In the image, the paper feed source 15 has multiple paper feed cassettes 19, and the paper output destination 17 has multiple paper output trays 21. A user touches (taps) the image with his/her finger, enabling selection of a paper feed cassette 19 in the paper feed source image 15 and selection of a paper output tray 21 in the paper output destination image 17.

The paper feed/output specifying unit 11 provides a paper feed/output specifying function. The paper feed/output specifying unit 11 receives at least information that specifies an actual paper feed source and an actual paper output destination of the image forming apparatus 1 as a result of linking the paper feed source image 15 with the paper output destination image 17 on the display operation screen 5.

Linking the paper feed source image 15 with the paper output destination image 17 is performed by forming a continuous path T between the paper feed source image 15 and the paper output destination image 17 by using a user's finger. For example, a user taps a paper feed cassette 19 in the paper feed source image 15 on the display operation screen 5 without releasing the user's finger from the display operation screen 5, and touches a paper output tray 21 in the paper output destination image 17 (dragging). Even when the user's finger is released from the display operation screen 5 at some midpoint, a continuous path T may be formed between the paper feed source image 15 and the paper output destination image 17 by restarting the dragging from the point at which the user's finger was released.

When the paper feed source image 15 and the paper output destination image 17 are linked together, a user may perform the link operation in such a manner that the path goes through all or some of the paper feed cassettes 19 of the paper feed source 15. Thus, the user may group paper feed cassettes containing sheets of the same size.

The condition specifying unit 13 provides a condition specifying function. The condition specifying unit 13 receives a condition for printing that serves as image forming, based on a portion J (hereinafter, may be referred to as a "gesture J") in the path T that links the paper feed source image 15 with the paper output destination image 17.

Conditions to be received are not particularly limited. For example, conditions to be received are those related to the sheet, and are a setting of duplex printing used in printing, settings for post-processing to be performed on the sheet after printing, and the like. In an embodiment, information specifying these conditions as well as information specifying the paper feed source and the paper output destination constitutes the printing condition.

Figure 3:
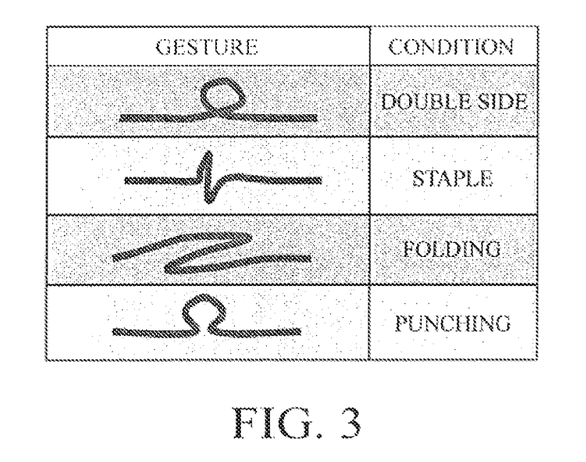
FIG. 3 shows an exemplary table describing gestures and the condition assigned to the gestures, according to an embodiment of the present disclosure.

Different settings are assigned to gestures J depending on the type of a gesture. FIG. 3 illustrates an exemplary table describing gestures and the settings assigned to the gestures. As in FIG. 3, a gesture J in this embodiment easily suggests a condition, for example "double side", "staple", "punching", "folding" specified to the gesture. When the condition specifying unit 13 recognizes a gesture J, the condition specifying unit 13 receives information specifying the condition based on the table.

Figure 4:
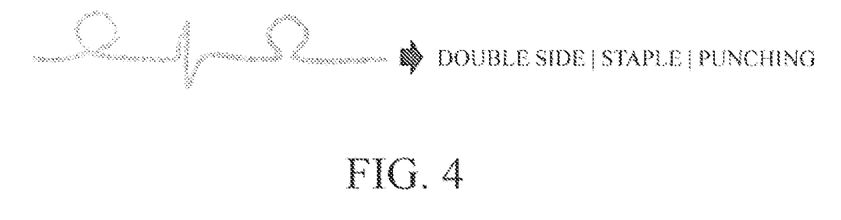
FIG. 4 illustrates an exemplary combination of gestures, according to an embodiment of the present disclosure.
Figure 5:
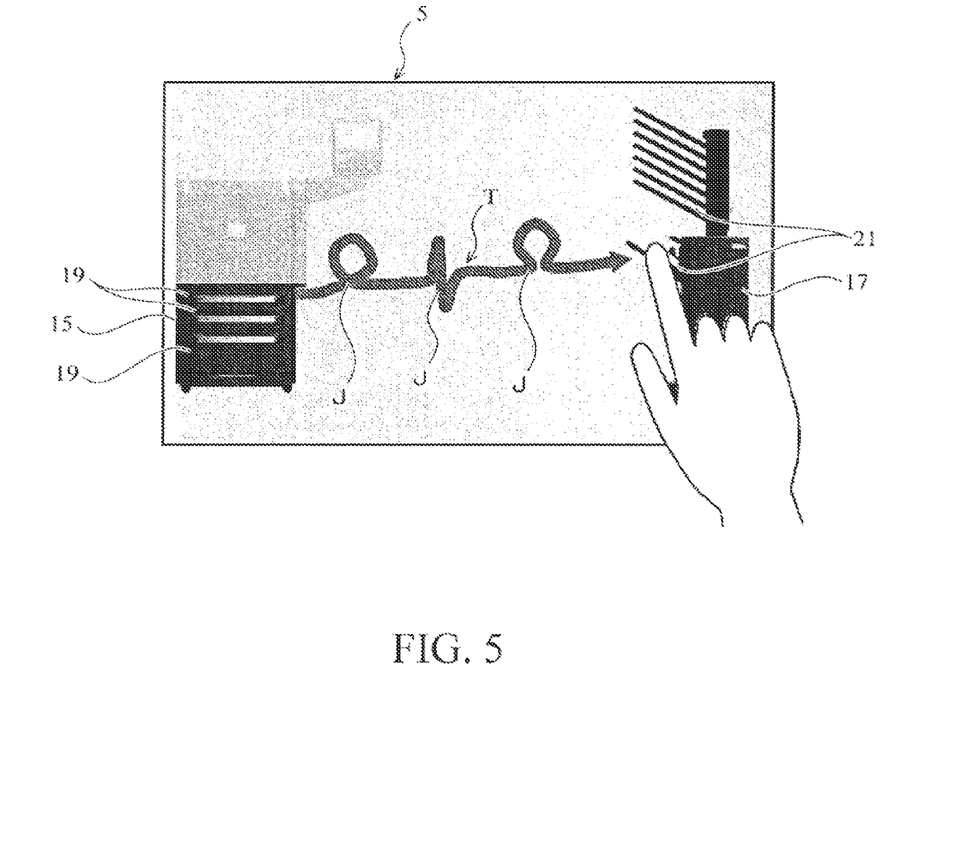
FIG. 5 illustrates an exemplary screen shot of the combination of gestures in FIG. 4, according to an embodiment of the present disclosure.

The condition specifying unit 13 receives multiple conditions based on a combination of different gestures J. FIG. 4 illustrates an exemplary combination of gestures. FIG. 5 illustrates an exemplary screen at the time when the paper feed source image and the paper output destination image are linked together with the combination of gestures J illustrated in FIG. 4. In the example in FIGS. 4 and 5, conditions of "double side", "staple", and "punching" are specified based on the table in FIG. 3.

The condition specifying unit 13 recognizes separations in the combined gestures J, enabling multiple gestures J to indicate multiple conditions. The recognition of separations in gestures J is not particularly limited. For example, separations are recognized in gestures J by performing determination based on, for example, a state in which a straight line having a specific length is present or a state in which the direction vector of the straight line is inclined by an angle equal to or greater than a specific angle with respect to a straight line connecting the start point to the end point.

Figure 6:
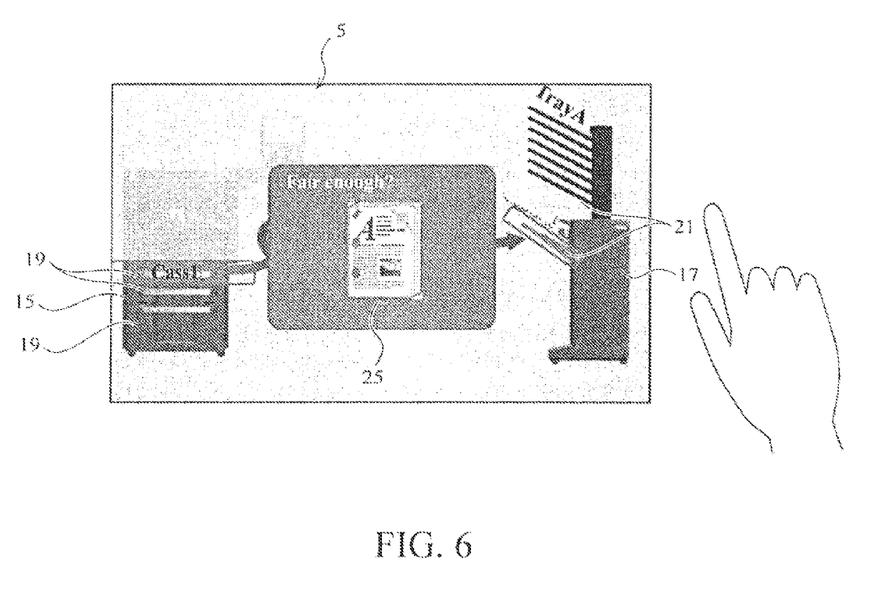
FIG. 6 illustrates an exemplary screen shot of an exemplary sheet image on a display operation screen, according to an embodiment of the present disclosure.

The sheet image display unit 23 provides the sheet image display function. The sheet image display unit 23 displays the sheet image in which a printing condition received by the condition specifying unit 13 is reflected, on the display operation screen 5. FIG. 6 illustrates an exemplary sheet image 25 on the display operation screen 5.

As in FIG. 6, the sheet image 25 is displayed as the confirmation screen between the paper feed source image 15 and the paper output destination image 17. In the example in FIG. 6, the conditions of "double side", "staple", and "punching" are reflected in the sheet image 25.

On the confirmation screen according to this embodiment, information that specifies the paper feed source (Cass1) and the paper output destination (TrayA) and that is received by the paper feed/output specifying unit 11 is also displayed on the paper feed source image 15 and the paper output destination image 17. The display operation is performed by the apparatus-image display unit 9.

The condition edit unit 27 performs the edit function. The condition edit unit 27 receives information about edits made to conditions displayed on the sheet image 25.

Figure 7:
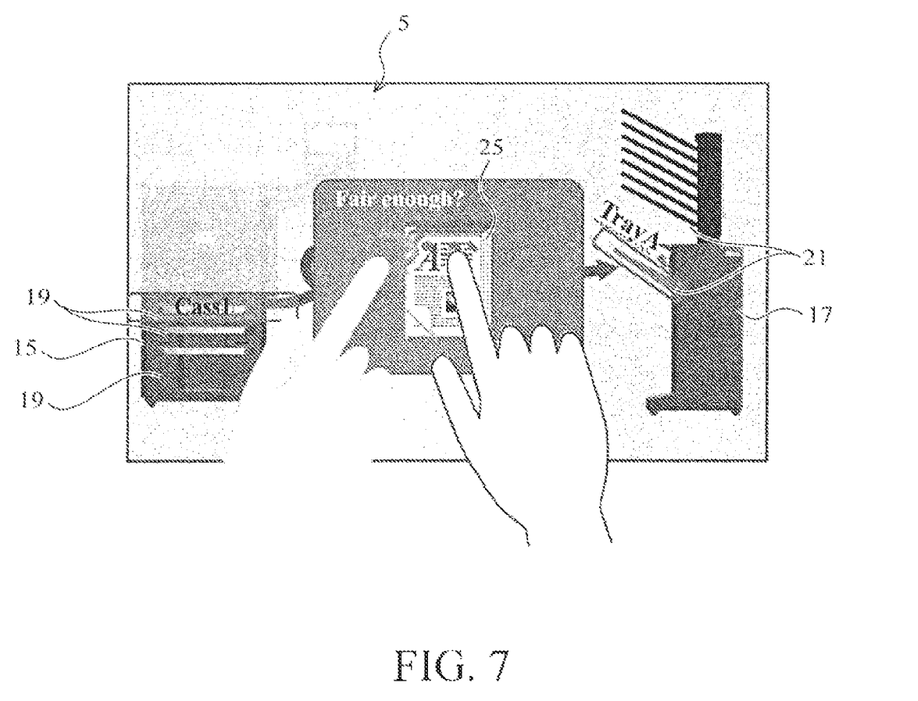
FIG. 7 illustrates an exemplary screen shot of an exemplary sheet image in editing, according to an embodiment of the present disclosure.

FIG. 7 illustrates an exemplary sheet image 25 in editing. As in FIG. 7, the sheet image 25 is subjected to operations of editing the conditions, such as flicking, dragging, and tapping, on the confirmation screen in FIG. 6. In this embodiment, the sheet image 25 also is subjected to editing the information specifying the paper feed source and the paper output destination. The editing operation is not particularly limited. An appropriate operation is employed as an editing operation based on the information about the paper feed source and the paper output destination that is to be edited, or based on attributes of the conditions corresponding to gestures J.

Figure 8:
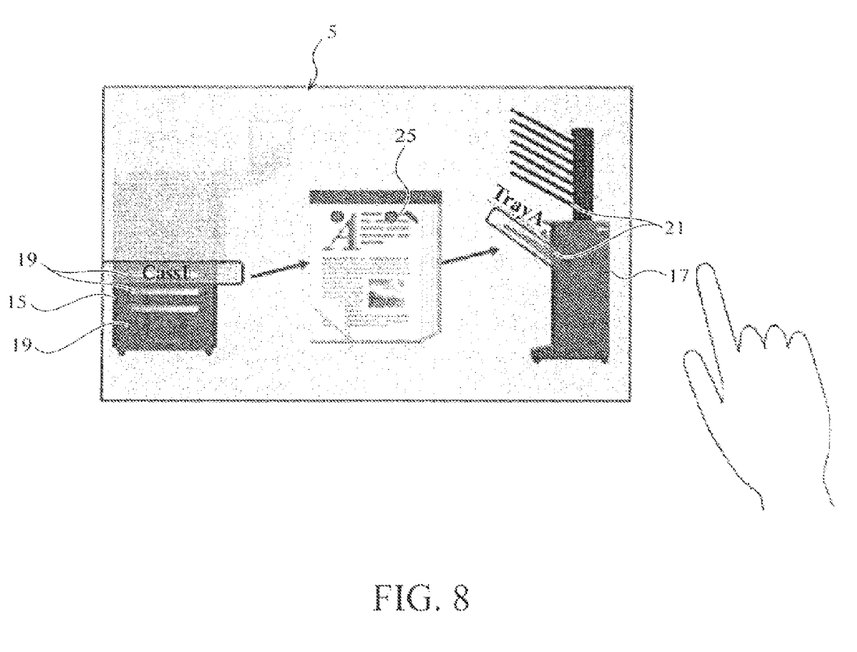
FIG. 8 illustrates an exemplary screen shot of an exemplary confirmed image according to an embodiment of the present disclosure.

The confirmed image display unit 29 performs the confirmed image display function. The confirmed image display unit 29 displays a confirmed image for the paper feed source and the paper output destination, and for the printing condition. FIG. 8 illustrates an exemplary confirmed image.

As in FIG. 8, the sheet image 25 corresponding to the confirmed sheet is displayed between the paper feed source image 15 and the paper output destination image 17 on which the paper feed cassette and the paper output tray that are confirmed are displayed. Thus, a user can intuitively recognize the paper feed cassette to which sheets of paper are actually supplied in the image forming apparatus 1, the conditions applied to sheets of paper in printing, and the paper output cassette to which the sheets of paper are outputted, in a state in which the paper feed cassette, the conditions, and the paper output cassette are associated with each other.

Figure 9:
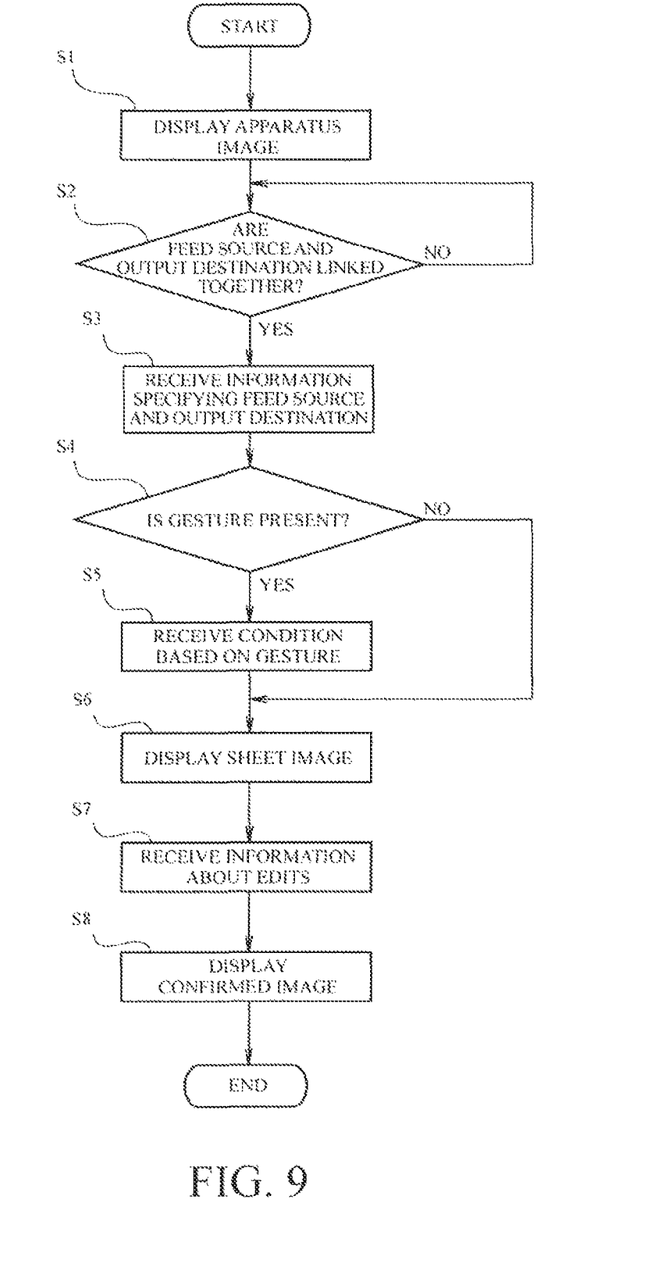
FIG. 9 illustrates a display operation according to an embodiment of the present disclosure.

A display operation will now be described. FIG. 9 illustrates a display operation.

In the example in FIGS. 5 to 8, the print settings are set on the display operation screen 5 in the display operation according to an embodiment. The display operation starts, for example, in response to a user tapping an operation key on the display operation screen 5.

The process in step S1, "DISPLAY APPARATUS IMAGE", is performed. In this process, as in FIG. 5, the apparatus-image display unit 9 separately displays the paper feed source image 15 and the paper output destination image 17 in the left and right portions on the display operation screen 5. Thus, step S1 is completed, and the process proceeds to step S2.

The process in step S2, "ARE FEED SOURCE AND OUTPUT DESTINATION LINKED TOGETHER?", is performed. In this process, the paper feed/output specifying unit 11 determines whether or not one continuous path T connects a paper feed cassette 19 in the paper feed source image 15 to a paper output tray 21 in the paper output destination image 17. If one continuous path T connects a paper feed cassette 19 to a paper output tray 21, the process proceeds to step S3 (YES). If not, the process repeatedly performs step S2 (NO).

In an embodiment, as in FIG. 5, since a paper feed cassette 19 in the paper feed source image 15 and a paper output tray 21 in the paper output destination image 17 are linked together, the process proceeds to step S3.

The process in step S3, "RECEIVE INFORMATION SPECIFYING FEED SOURCE AND OUTPUT DESTINATION", is performed. In this process, the paper feed/output specifying unit 11 receives information specifying the paper feed cassette 19 in the paper feed source image 15 and the paper output tray 21 in the paper output destination image 17 that are linked together on the display operation screen 5. In an embodiment, a cassette "Cass1" is specified as the paper feed cassette 19, and a tray "TrayA" is specified as the paper output tray 21.

If step S3 is completed, the process proceeds to step S4.

The process in step S4, "IS GESTURE PRESENT?", is performed. In this process, the condition specifying unit 13 determines whether or not a gesture J based on the table in FIG. 3 is present at some midpoint in the link between the paper feed source image 15 and the paper output destination image 17.

If a gesture J is present, the process proceeds to step S5 (YES). If a gesture J is not present, the process proceeds to step S6 (NO). In an embodiment, as in FIG. 5, since gestures J are present, the process proceeds to step S5.

The process in step S5, "RECEIVE CONDITION BASED ON GESTURE", is performed. In this process, the condition specifying unit 13 receives information specifying a condition according to the gesture J based on the table in FIG. 3. In an embodiment, as in FIGS. 3 to 5, conditions of "double side", "staple", and "punching" are received. If step S5 is completed, the process proceeds to step S6.

The process in step S6, "DISPLAY SHEET IMAGE", is performed. In this process, the sheet image display unit 23 generates the sheet image 25 in FIG. 6 based on the specifying operation performed in step S5, and displays it on the display operation screen 5. At that time, the apparatus-image display unit 9 displays the paper feed cassette 19 and the paper output tray 21 that are specified in step S3, on the paper feed source image 15 and the paper output destination image 17.

If the process proceeds from step S4, a sheet image specifying no conditions may be displayed. Alternatively, no sheet images may be displayed.

If step S6 is completed, the process proceeds to step S7.

The process in step S7, "RECEIVE INFORMATION ABOUT EDITS", is performed. In this process, as in FIG. 7, the condition edit unit 27 receives information about edits made to the paper feed cassette 19 in the paper feed source image 15 and the paper output tray 21 in the paper output destination image 17, and information about edits made to the conditions on the sheet image 25 on the confirmation screen. When such information is to be received, as in FIGS. 6 and 7, for example, a message "Is the specified information correct?" may be displayed to prompt a user to perform an editing operation.

Editing of the paper feed cassette 19 and the paper output tray 21 is not particularly limited, and may be performed by tapping. Editing of the conditions on the sheet image 25 may be performed by inputting a gesture J again or by performing an editing operation on the sheet image 25.

The editing operation may be performed by performing a different operation depending on a condition. For example, editing the binding direction is performed by dragging an edge on the top, the bottom, the left side, or the right side of the sheet image 25. Editing the staple position is performed by tapping a corner of the sheet image 25. Editing the punch position is performed by tapping an edge on the top, the bottom, the left side, or the right side of the sheet image 25. Deleting a condition from the sheet image 25 is performed by flicking.

After editing is thus performed, an operation for completing the editing is performed so that the edited information is fixed. When no editing is performed, an operation for completing the editing is performed so that the original information is fixed.

If step S7 is completed, the process proceeds to step S8.

The process in step S8, "DISPLAY CONFIRMED IMAGE", is performed. In this process, the final print settings that are fixed in step S7 are displayed as a confirmed image in FIG. 8 on the display operation screen 5.

In an embodiment, the paper feed source image 15 and the paper output destination image 17 are actually linked together through an intuitive operation on the display operation screen 5, enabling a user to easily set print settings while the number of operations is reduced.

In an embodiment, the condition specifying unit 13 receives information specifying printing conditions based on a gesture J in some midpoint in a link between the paper feed source image 15 and the paper output destination image 17.

Accordingly, in an embodiment, a user can also specify a printing condition through an intuitive operation. Thus, a user can set print settings easily while the number of operations is further reduced.

A gesture J may easily suggest a condition that is to be specified. Thus, a user can easily perform a specifying operation.

In an embodiment, the paper feed source image 15 and the paper output destination image 17 are separately located, enabling a gesture J to be made between the paper feed source image 15 and the paper output destination image 17 without difficulty. Thus, a user can surely input a gesture J.

The condition specifying unit 13 receives information specifying multiple conditions based on a combination of gestures J at different midpoints, enabling a user to set the print settings with fewer operations.

Even when multiple gestures J are thus combined, operations can be performed without difficulty between the paper feed source image 15 and the paper output destination image 17 that are separately located.

In an embodiment, the sheet image display unit 23 displays the sheet image 25 on which conditions received by the condition specifying unit 13 are reflected, on the display operation screen 5. Thus, when conditions are inputted by using gestures J, a user can check the result, reducing the occurrence of an error in the operations in which the conditions are specified.

In an embodiment, the condition edit unit 27 receives information about edits made to a condition on the sheet image 25. Thus, occurrence of an error in operations in which conditions are specified can be reduced, and a user can also easily edit information to obtain the intended information.

An embodiment of the present disclosure has been described, but the present invention is not limited to this. Various changes may be made.

For example, a gesture J and the condition corresponding to the gesture J may be freely set by a user. In this case, for example, a user may set or change the table illustrated in FIG. 3.

The path T (including a gesture J) that links the paper feed source image 15 with the paper output destination image 17 is inputted again, whereby the existing specified information is overwritten with the new specified information, or the new specified information is added to the existing specified information.

In the specifying of a condition using a gesture J, not only selection of a function as in an embodiment, but also selection of more detailed information may be performed. For example, when the same gesture J is inputted multiple times, positions, sizes, a range, the number of conditions, and the like may be specified based on the specified function. An example will be described by using a gesture J of "punching". When two gestures J are inputted, sub-punching of two holes may be specified. When three gestures J are inputted, main punching of three holes may be specified. Other than that, the detail of a condition may be specified by using the direction or the like of a gesture J.

The present disclosure may be applied to a display operation device without a touch panel. In this case, an operation device such as a mouse and a display device such as a display may be combined. An operation of linking the paper feed source with the paper output destination in an image on a screen may be achieved, for example, by performing a dragging operation with a mouse.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A display operation device, comprising:
   an apparatus-image display unit configured to display an image of an image forming apparatus on a screen, the image being an image in which a paper feed source and a paper output destination are separately located;
   a paper feed/output specifying unit configured to receive information specifying the paper feed source and the paper output destination as a result of linking of the paper feed source with the paper output destination in the image on the screen; and
   a condition specifying unit configured to receive information specifying a condition of image formation, based on a portion in a continuous path linking the paper feed source with the paper output destination in the image,
   wherein: the continuous path includes a combination of a plurality of different portions;
   and the condition specifying unit is configured to receive a plurality of conditions based on the combination of the plurality of different portions in the continuous path.

2. The display operation device according to claim 1, comprising:
   a condition specifying unit configured to receive information specifying a condition of image formation, based on the combination of the plurality of different gestures in the continuous path linking the paper feed source with the paper output destination in the image.

3. The display operation device according to claim 2, wherein the condition specifying unit is configured to enable the plurality of different gestures to indicate a plurality of conditions by recognizing a separation in the plurality of different gestures in the continuous path.

4. The display operation device according to claim 3, comprising:
   a sheet image display unit configured to display a sheet image on the screen in which the plurality of conditions is reflected, the plurality of conditions being received by the condition specifying unit.

5. The display operation device according to claim 4, comprising:
   a condition edit unit configured to receive information about an edit made to the specified condition on the sheet image.

6. The display operation device according to claim 2, comprising:
   a sheet image display unit configured to display a sheet image on the screen, the sheet image being an image in which the condition of the image formation is reflected, the condition being received by the condition specifying unit.

7. The display operation device according to claim 6, comprising:
   a condition edit unit configured to receive information about an edit made to the specified condition on the sheet image.

8. An image forming apparatus comprising the display operation device according to claim 1.

9. An image forming apparatus comprising the display operation device according to claim 2.

10. A non-transitory computer-readable recording medium storing a display operation program executable by a computer, the display operation program causing the computer to serve as:
- an apparatus-image display unit that displays an image of the image forming apparatus on a screen, the image being an image in which a paper feed source and a paper output destination are separately located;
- a paper feed/output specifying unit that receives information specifying the paper feed source and the paper output destination as a result of linking of the paper feed source with the paper output destination in the image on the screen; and
- a condition specifying unit that receives information specifying a condition of image formation, based on a portion in a continuous path linking the paper feed source with the paper output destination in the image, wherein:
- the continuous path includes a combination of a plurality of different portions; and
- the condition specifying unit receives a plurality of conditions based on the combination of the plurality of different portions in the continuous path.

11. The non-transitory computer-readable recording medium according to claim 10, the display operation program causing the computer to serve as:
- a condition specifying unit that receives information specifying a condition of image formation, based on the combination of the plurality of different gestures in the continuous path linking the paper feed source with the paper output destination in the image.

12. The non-transitory computer-readable recording medium according to claim 11, wherein the condition specifying unit enables the plurality of different gestures to indicate a plurality of conditions by recognizing a separation in the a plurality of different gestures in the continuous path.

13. A display operation method, comprising:
- displaying, via an apparatus-image display unit, an image of an image forming apparatus on a screen, the image being an image in which a paper feed source and a paper output destination are separately located;
- receiving, via a paper feed/output specifying unit, information specifying the paper feed source and the paper output destination as a result of linking of the paper feed source with the paper output destination in the image on the screen; and
- receiving, via a condition specifying unit, information specifying a condition of image formation, based on a portion in a continuous path linking the paper feed source with the paper output destination in the image, wherein:
- the continuous path includes a combination of a plurality of different portions; and
- the condition specifying unit receives a plurality of conditions based on the combination of the plurality of different portions in the continuous path.

14. The display operation method according to claim 13, comprising:
- receiving, via a condition specifying unit, information specifying a condition of image formation, based on the combination of the plurality of different gestures in the continuous path linking the paper feed source with the paper output destination in the image.

15. The display operation method according to claim 14, wherein the condition specifying unit enables the plurality of different gestures to indicate a plurality of conditions by recognizing a separation in the plurality of different gestures in the continuous path.

* * * * *